US009274650B2

United States Patent
Su et al.

(10) Patent No.: US 9,274,650 B2
(45) Date of Patent: Mar. 1, 2016

(54) OPTICAL TOUCH DEVICE AND RELATED IMAGE DETECTING COMPONENT AND LOCATING METHOD

(71) Applicant: PixArt Imaging Inc., Hsin-Chu (TW)

(72) Inventors: Tzung-Min Su, Hsin-Chu (TW); Yi-Hsien Ko, Hsin-Chu (TW); Hsin-Chi Cheng, Hsin-Chu (TW); Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 66 days.

(21) Appl. No.: 14/195,824

(22) Filed: Mar. 3, 2014

(65) Prior Publication Data

US 2014/0184571 A1    Jul. 3, 2014

Related U.S. Application Data

(63) Continuation-in-part of application No. 12/756,852, filed on Apr. 8, 2010, now Pat. No. 8,994,693.

(30) Foreign Application Priority Data

Nov. 16, 2009  (TW) .............................. 98138898 A
May 14, 2013   (TW) .............................. 102117066 A (51) Int. Cl.
*G06F 3/042*  (2006.01)

(52) U.S. Cl.
CPC ............ *G06F 3/0428* (2013.01); *G06F 3/0421* (2013.01)

(58) Field of Classification Search
CPC ............................. G06F 3/0421; G06F 3/0428
USPC .................................................. 345/175, 173
See application file for complete search history.

(56) References Cited

U.S. PATENT DOCUMENTS

| 8,432,377 | B2 | 4/2013 | Newton | |
|---|---|---|---|---|
| 2006/0232830 | A1* | 10/2006 | Kobayashi | .................. 358/448 |
| 2011/0116104 | A1 | 5/2011 | Kao | |
| 2012/0038588 | A1 | 2/2012 | Li | |
| 2014/0085264 | A1 | 3/2014 | Su | |

FOREIGN PATENT DOCUMENTS

| TW | 201118688 | 6/2011 |
|---|---|---|
| TW | 201317858 | 5/2013 |

* cited by examiner

*Primary Examiner* — Kathy Wang-Hurst
*Assistant Examiner* — Jose Soto Lopez
(74) *Attorney, Agent, or Firm* — Winston Hsu; Scott Margo (57) ABSTRACT

A locating method applied to an optical touch device is disclosed. The optical touch device includes at least one image detecting component for detecting an imaging position of an object and generating a touch position of the object on a plane according to the imaging position. The at least one image detecting component includes a plurality of pixels. The locating method includes dividing the pixels into a first group and a second group along a first direction, analyzing dimension ratios of a darkness point respectively relative to the first group and the second group when the darkness point formed by the object is simultaneously detected by the first group and the second group, and calculating the imaging position of the darkness point inside the image detecting component according to the dimension ratios.

27 Claims, 9 Drawing Sheets

OPTICAL TOUCH DEVICE AND RELATED IMAGE DETECTING COMPONENT AND LOCATING METHOD

CROSS REFERENCE TO RELATED APPLICATIONS

This application is a continuation in part of U.S. application Ser. No. 12/756,852, filed 2010 Apr. 8.

BACKGROUND OF THE INVENTION

1. Field of the Invention

The present invention relates to an optical touch device and a related locating method, and more particularly, to an optical touch device with preferred coordinates locating accuracy and a related image detecting component and a related locating method.

2. Description of the Prior Art

Nowadays, a touch operation has been one of necessary functions of the consumer electronic devices. A touch device is an important component to achieve the touch operation. Generally, familiar types of the touch device include, for example, a resistive touch device, a capacitive touch device and an optical touch device. The electronic devices can be equipped with various touch devices in accordance with the various demands.

Figure 1:
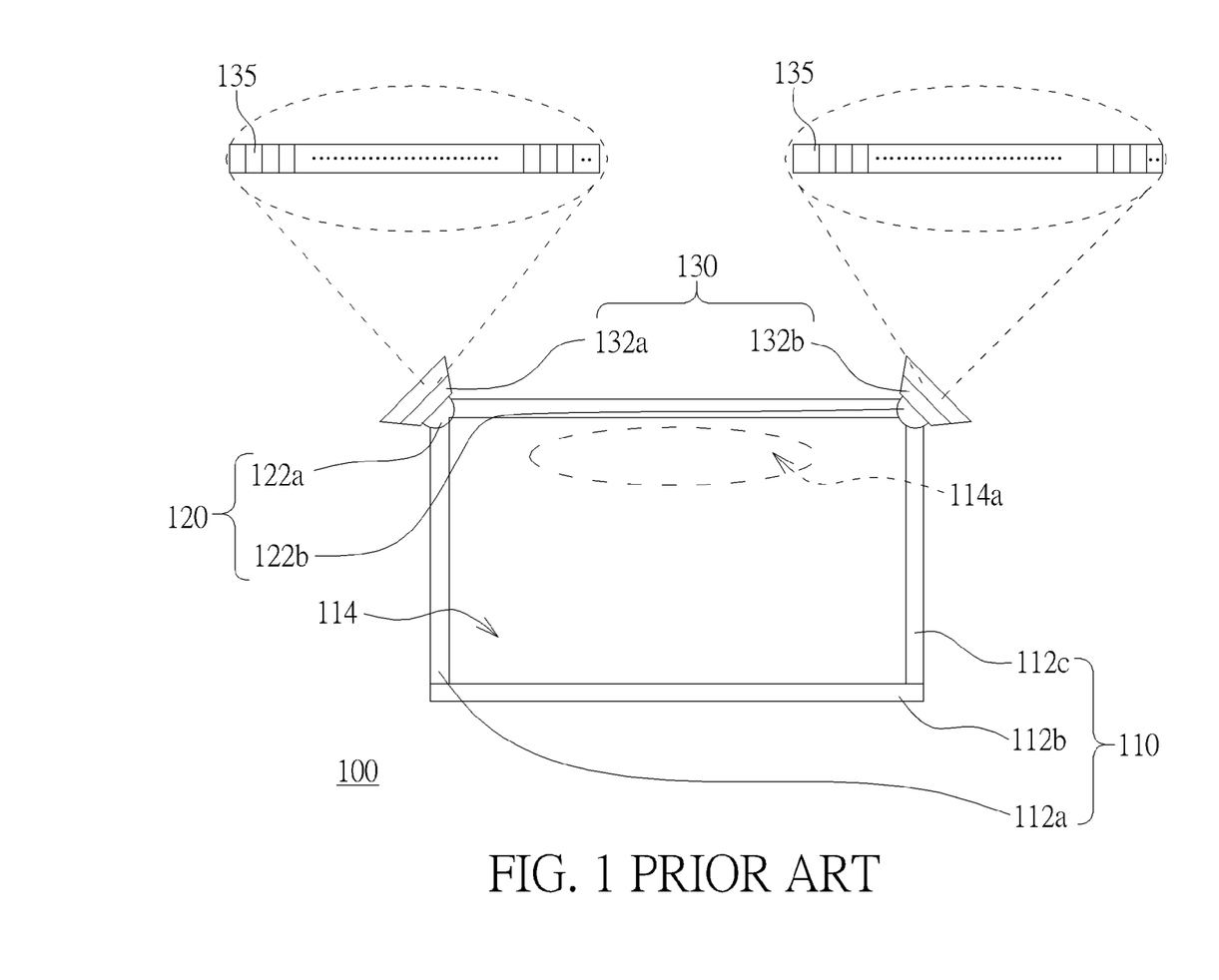
FIG. 1 is a structural diagram of an optical touch device in the prior art.

Please refer to FIG. 1. FIG. 1 is a structural diagram of an optical touch device in the prior art. The conventional optical touch device 100 includes a light guide module 110, a light source module 120 and an image detecting module 130. The light guide module 110 includes three light reflecting bars 112a, 112b and 112c arranged along three sides of a rectangle track. The light reflecting bar 112a faces toward the light reflecting bar 112c, and the light reflecting bar 112b is connected between the light guide bar 112a and the light reflecting bar 112c. The area inside the rectangle track defines a sensory area 114. The light source module 120 includes two light emitting components 122a and 122b. The light emitting component 122a is disposed on an end of the light guide bar 112a opposite to the light guide bar 112b, and the light emitting component 122b is disposed on an end of the light guide bar 112c opposite to the light guide bar 112b. The light source module 120 is configured for emitting light to the three light reflecting bars 112a, 112b and 112c. The three light reflecting bars 112a, 112b and 112c reflect the light from the light source module 120 to irradiate the sensory area 114. The image detecting module 130 includes two image detecting components 132a and 132b. The image detecting component 132a is disposed on the end of the light reflecting bar 112a opposite to the light reflecting bar 112b, and the image detecting component 132b is disposed on the end of the light reflecting bar 112c opposite to the light reflecting bar 112b. Each of the two image detecting components 132a and 132b includes a plurality of pixels 135 arranged along a straight direction. The pixels 135 detect an object (such ad a touch point) located inside the sensory area 114, and a position (coordinates) of the object can be calculated according to the detected information.

A field of view of the image detecting component 132a covers the light reflecting bars 112b and 112c. It is to say, the pixels 135 of the image detecting component 132a detect the light reflecting bars 112b and 112c. When the object is located inside the sensory area 114, and a darkness point formed by the object is located at the light reflecting bar 112b, the light reflecting bar 112c, or a connecting portion of the light reflecting bar 112b and the light reflecting bar 112c, the darkness point can be detected by a part of the pixels 135 of the image detecting component 132a. Similarly, a field of view of the image detecting component 132b covers the light reflecting bars 112a and 112b. That is, the pixels 135 of the image detecting component 132a detect the light reflecting bars 112a and 112b. When the object is located inside the sensory area 114, and the darkness point formed by the object is located at the light reflecting bar 112a, the light reflecting bar 112b, or a connecting portion of the light reflecting bar 112a and the light reflecting bar 112b, the darkness point can be detected by a part of the pixels 135 of the image detecting component 132b.

Generally, the conventional optical touch device 100 utilizes a medium center calculating method or a gravity center calculating method to calculate the imaging position of the darkness point formed by the object, so as to determine the position of the object. However, positions of the darkness points formed by all objects inside the sensory area 114 cannot be calculated accurately by the medium center calculating method or the gravity center calculating method. For example, in the case of utilizing the medium center calculating method to calculate the imaging position of the darkness point, the sensory area 114 of the conventional optical touch device 100 has an insensitive area 114a. As the object is just located inside the insensitive area 114a, the calculated position of the darkness point by the medium center calculating method generates an error due to a large offset angle of the light. Furthermore, as the imaging position of the darkness point is calculated by the gravity center calculating method, the calculated position of the darkness point by the gravity center calculating method generates an error when the darkness point formed by the object is just located at the connecting portion of two adjacent light reflecting bars.

Figure 2:
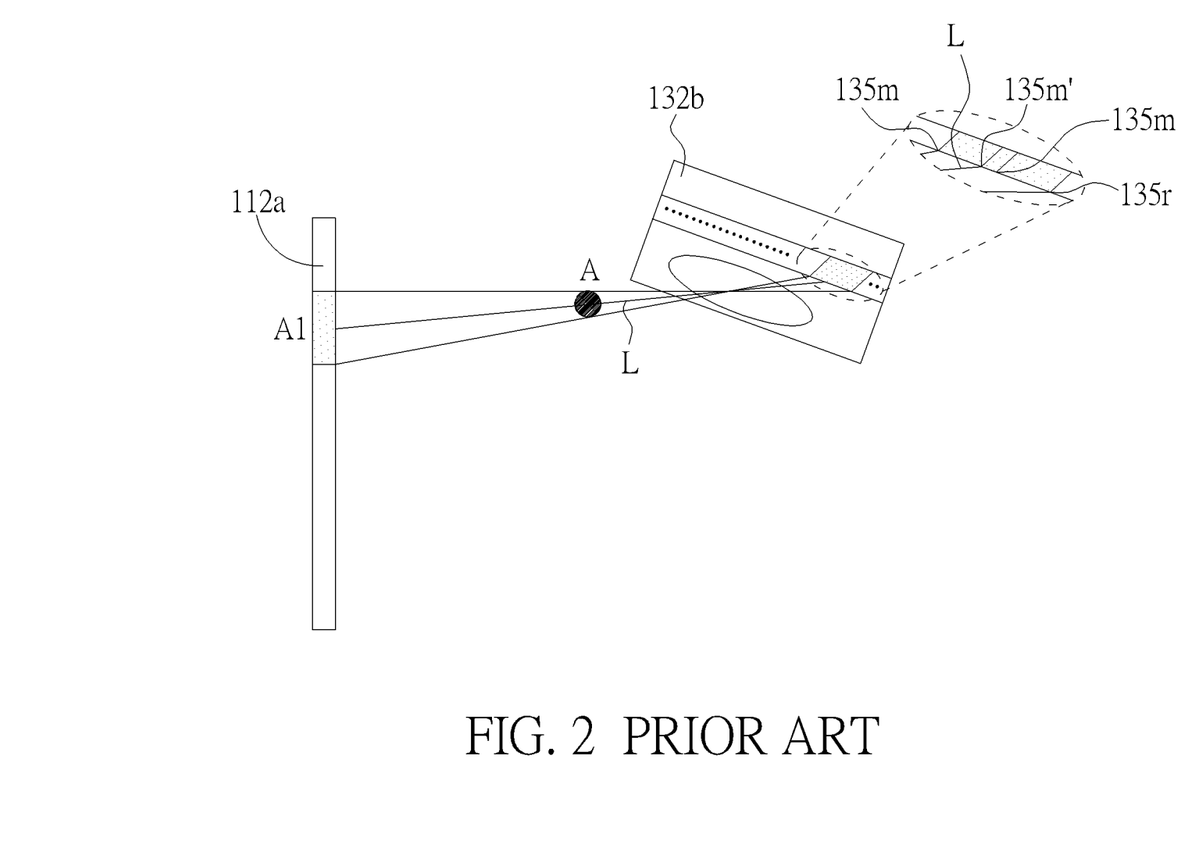
FIG. 2 is a diagram of utilizing a medium center calculating method to calculate a darkness point formed by an object inside an insensitive area shown in FIG. 1.

Please refer to FIG. 2. FIG. 2 is a diagram of utilizing the medium center calculating method to calculate the darkness point formed by the object inside the insensitive area shown in FIG. 1. The image detecting component 132b is described as an example. When the medium center calculating method is utilized to calculate a position of the darkness point A1 formed by the object A, which is located inside the insensitive area 114a, the n-th pixel 135n to the r-th pixel 135r of the image detecting component 132b detect the darkness point A1 imaged on the light reflecting bar 112a by the object A. The calculated center position of the darkness point A1 by the medium center calculating method is equal to (n+r)/2, which means the center of the darkness point A1 corresponds to the (n+r)/2-th pixel 135m. However, a straight line L passing through the center of the object A and the center of the darkness point A1 is connected to the pixel 135m', the correct center of the darkness point A1 should correspond to the pixel 135m' rather than the pixel 135m. Similarly, the image detecting component 132a has the same drawback. Therefore, when the position of the darkness point formed by the object inside the insensitive area 114a is calculated by the medium center calculating method, the calculated position of the darkness point includes an error.

Figure 3:
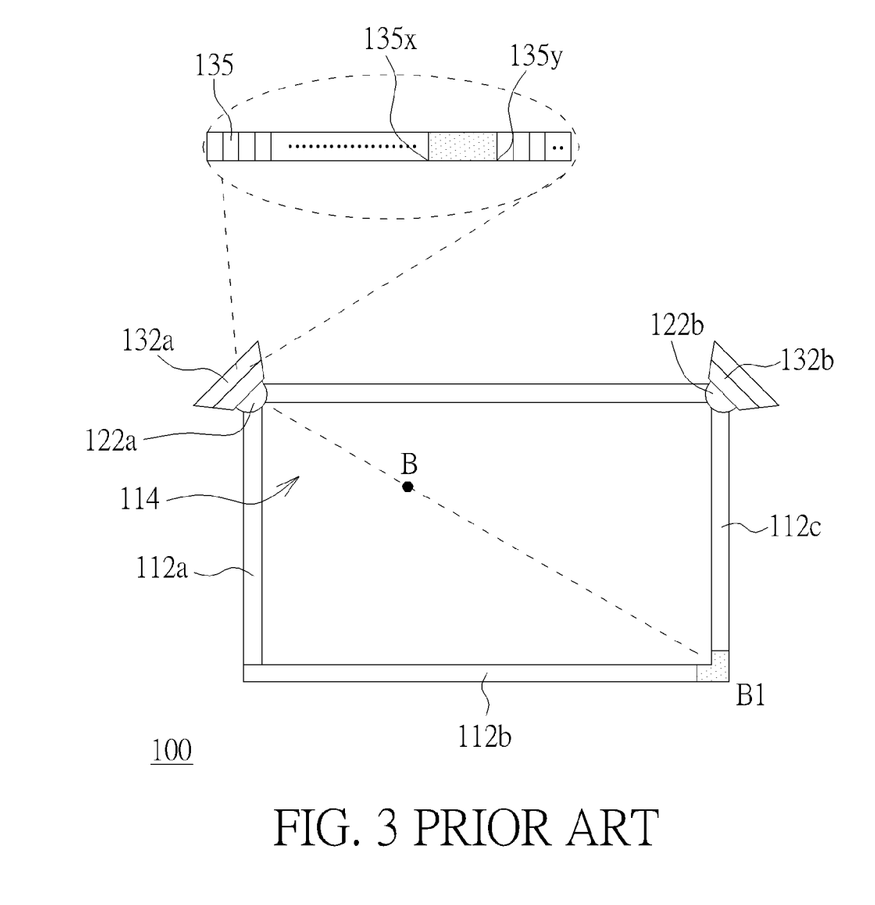
FIG. 3 is a diagram of utilizing a gravity center calculating method to calculate the darkness point formed by the object inside a sensory area shown in FIG. 1.

Please refer to FIG. 3. FIG. 3 is a diagram of utilizing the gravity center calculating method to calculate the darkness point formed by the object inside the sensory area shown in FIG. 1. The image detecting component 132a is described as an example to utilize the gravity center calculating method to calculate the darkness point B1 formed by the object B inside the sensory area 114. The x-th pixel 135x to the y-th pixel 135y of the image detecting component 132a can detect the darkness point B1 formed by the object B. A calculating formula of the gravity center calculating method is as follow:

$$Cg = \frac{\sum_{w=x}^{y} |bg[w] - img[w]| \times w}{\sum_{w=x}^{y} |bg[w] - img[w]|}$$

In this formula, w represents the w-th pixel, bg [w] represents a background brightness of the w-th pixel, img [w] represents an image brightness of the image detected by the w-th pixel, and Cg represents the calculated gravity center position of the darkness point B1 formed by the object B. As shown in FIG. 3, when the darkness point B1 formed by the object B is located at the connecting portion of the light reflecting bar 112b and the light reflecting bar 112c, because the conventional optical touch device 100 has weak irradiation at the connecting portion of the light reflecting bar 112b and the light reflecting bar 112c, the background brightness and the image brightness detected by the pixels 135 of the image detecting components 132a are inaccurate. Therefore, the calculated position of the darkness point B1 is different from the actual position of the darkness point B1.

Besides, the sensory area 114 can be divided into a plurality of sensory subareas, and a boundary of the sensory subareas preferably is not disposed on the connecting portion of the adjacent light reflecting bars 112b and 112c (such as being located at the light reflecting bar 112b or the light reflecting bar 112c). When the darkness point B1 formed by the object B is imaged on the boundary of the subareas, the actual imaging position of the darkness point B1 has an apparent error no matter what algorithm (the gravity center calculating method or the medium center calculating method) is utilized to calculate the touch position of the object B by the image detecting component 132a. Therefore, the conventional locating method can not accurately calculate the position of the darkness point formed by the object located inside any part of the sensory area 114. Thus, the conventional optical touch device can not determine the position of the object accurately.

SUMMARY OF THE INVENTION

The present invention provides an optical touch device with preferred coordinates locating accuracy and a related image detecting component and a related locating method for solving above drawbacks.

According to the claimed invention, a locating method applied to an optical touch device is disclosed. The optical touch device includes at least one image detecting component for detecting an imaging position of an object and generating a touch position of the object on a plane according to the imaging position. The at least one image detecting component includes a plurality of pixels. The locating method includes dividing the plurality of pixels into a first group and a second group along a first direction, analyzing dimension ratios of a darkness point respectively relative to the first group and the second group when the darkness point formed by the object is simultaneously detected by the first group and the second group, and calculating the imaging position of the darkness point inside the image detecting component according to the dimension ratios.

According to the claimed invention, the locating method of calculating the imaging position of the darkness point inside the image detecting component according to the dimension ratios includes comparing the dimension ratio of the darkness point relative to the first group with the dimension ratio of the darkness point relative to the second group, determining whether the darkness point is imaged on the first group or the second group according to the maximal dimension ratio, and utilizing the corresponding algorithm to calculate the imaging position of the darkness point.

According to the claimed invention, the darkness point is set on the second group when the dimension ratio of the darkness point relative to the first group is equal to the dimension ratios of the darkness point relative to the second group; further, the darkness point is set on the first group or the second group according to an imaging position of a former darkness point detected by the image detecting component.

According to the claimed invention, the locating method of calculating the imaging position of the darkness point inside the image detecting component according to the dimension ratios includes utilizing the first algorithm and the second algorithm to respectively calculate a first subgroup imaging position of the darkness point on the first group and a second subgroup imaging position of the darkness point on the second group, setting the dimension ratio of the darkness point relative to the first group and the dimension ratio of the darkness point relative to the second group as weight indices, and multiplying the first subgroup imaging position and the second subgroup imaging position respectively by the corresponding weight indices and adding up two multiplication results, so as to obtain the imaging position of the darkness point.

According to the claimed invention, the locating method of calculating the imaging position of the darkness point inside the image detecting component according to the dimension ratios includes utilizing the first algorithm and the second algorithm to respectively calculate a first temporary imaging position and a second temporary imaging position of the darkness point inside the image detecting component, setting the dimension ratio of the darkness point relative to the first group and the dimension ratio of the darkness point relative to the second group as weight indices, and multiplying the first temporary imaging position and the second temporary imaging position respectively by the corresponding weight indices and adding up two multiplication results, so as to obtain the imaging position of the darkness point.

According to the claimed invention, an optical touch device includes a frame, a light source module, a first image detecting component and a second image detecting component. The frame includes a first sidewall, a second sidewall, a third sidewall and a fourth sidewall. The first sidewall is opposite to the third sidewall, and the second sidewall is opposite to the fourth sidewall. A sensory area is formed inside the frame. The light source module is for providing light to the sensory area. The first image detecting component is disposed between two adjacent ends of the first sidewall and the second sidewall. A field of view of the first image detecting component covers the third sidewall and the fourth sidewall. The second image detecting component is disposed between two adjacent ends of the second sidewall and the third sidewall. A field of view of the second image detecting component covers the first sidewall and the fourth sidewall. The first image detecting component and the second image detecting component respectively includes a plurality of pixels, and the plurality of pixels is at least divided into a first group and a second group along a first direction. Dimension ratios of a darkness point relative to the first group and the second group are respectively analyzed when the darkness point formed by an object is simultaneously detected by the first group and the second group, so as to calculate an imaging position of the darkness point according to the dimension ratios, and to generate a touch position of the object on a plane according to the imaging position.

According to the claimed invention, an image detecting component applied to an optical touch device is disclosed. The image detecting component includes a light receiving unit, a digital signal processing unit and a central processing unit. The light receiving unit includes a plurality of pixels for receiving an optical signal from an object. The plurality of pixels is divided into a first group and a second group along a first direction. The digital signal processing unit is electrically connected to the light receiving unit for processing the optical signal detected by the plurality of pixels. The central processing unit is electrically connected to the digital signal processing unit. The central processing unit analyzes the dimension ratios of the darkness point respectively relative to the first group and the second group when the darkness point formed by the object is simultaneously detected by the first group and the second group. The central processing unit further calculates an imaging position of the darkness point according to the dimension ratios, so as to generate the touch position of the object on the plane according to the imaging position.

When the pixels of different groups (the adjacent groups) simultaneously detect the darkness point of the object, the imaging position of the darkness point inside the image detecting component can be calculated according to the dimension ratios of the darkness point relative to the adjacent groups. Therefore, the optical touch device and the related image detecting component and the locating method of the present invention can accurately calculate the imaging position of the darkness point inside the sensory area, to increase the touch positioning accuracy of the object.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
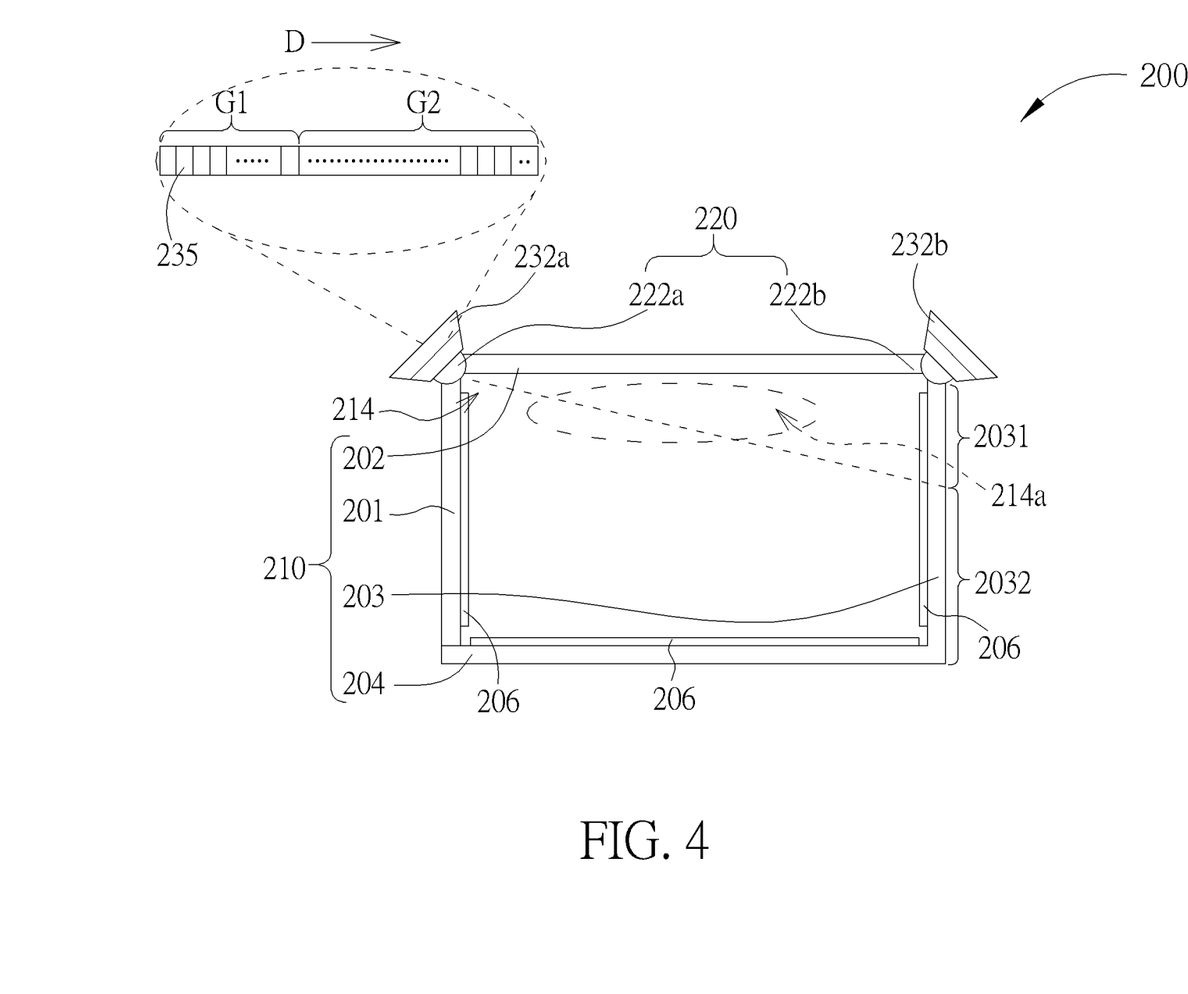
FIG. 4 is a diagram of an optical touch device according to an embodiment of the present invention.

Please refer to FIG. 4. FIG. 4 is a diagram of an optical touch device 200 according to an embodiment of the present invention. The optical touch device 200 includes a frame 210, a light source module 220, a first image detecting component 232a and a second image detecting component 232b. In this embodiment, the frame 210 can be a rectangular structure preferably. The frame 210 includes a first sidewall 201, a second sidewall 202, a third sidewall 203 and a fourth sidewall 204. The first sidewall 201 is opposite to the third sidewall 203, and the second sidewall 202 is opposite to the fourth sidewall 204. A sensory area 214 is formed inside the frame 210, which means the first sidewall 201, the second sidewall 202, the third sidewall 203 and the fourth sidewall 204 surrounds and defines the sensory area 214. The light source module 220 provides light to the sensory area 214. As an object is put on the sensory area 214, the first image detecting component 232a and the second image detecting component 232b can detect an imagining position of the object, and generate a touch position (touch coordinates) of the object on a plane of the sensory area 214 according to the imagining position for driving the application program. In addition, a plurality of light guiding components 206 can be disposed on the first sidewall 210, the third sidewall 203 and the fourth sidewall 204 of the frame 210 respectively. The light guiding component 206 can be a light guide bar or a reflective bar. The light guiding component (not shown in figures) further can be disposed on the second sidewall 202 accordingly.

The light source module 220 includes a first light emitting component 222a and a second light emitting component 222b. The first light emitting component 222a is disposed between two adjacent ends of the first sidewall 201 and the second sidewall 202 of the frame 210. The second light emitting component 222 b is disposed between two adjacent ends of the second sidewall 202 and the third sidewall 203 of the frame 210. The first light emitting component 222a and the second light emitting component 222b face toward the sensory area 214 to emit the light. The first light emitting component 222a and the second light emitting component 222b of the light source module 220 can preferably be, but not limited to, the light emitting diode.

Figure 5:
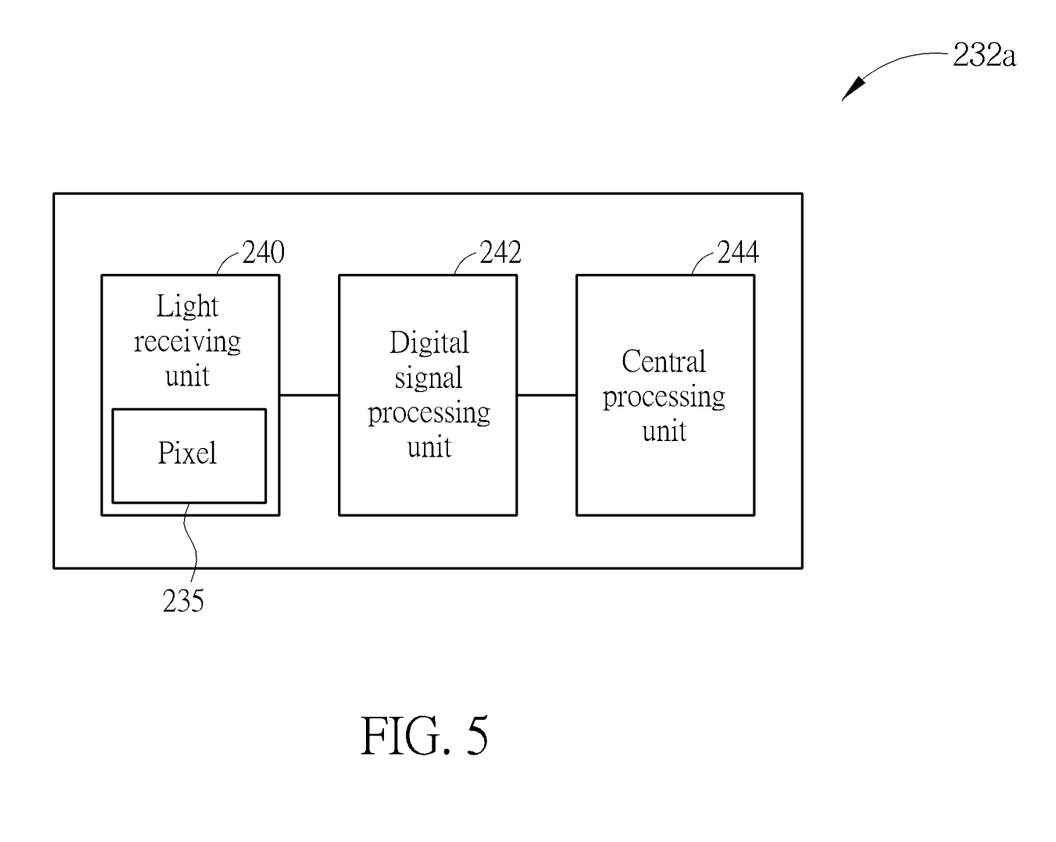
FIG. 5 is a functional block diagram of an image detecting component according to the embodiment of the present invention.

The first image detecting component 232a is disposed between the adjacent ends of the first sidewall 201 and the second sidewall 202 of the frame 210. A field of view of the first image detecting component 232a covers the third sidewall 203 and the fourth sidewall 204 of the frame 210. The second image detecting component 232b is disposed between the adjacent ends of the second sidewall 202 and the third sidewall 203 of the frame 210. A field of view of the second image detecting component 232b covers the first sidewall 201 and the fourth sidewall 204 of the frame 210. Please refer to FIG. 5. FIG. 5 is a functional block diagram of the image detecting component 232a (or 232b) according to the embodiment of the present invention. Disposition and function of units of the second image detecting component 232b are substantially equal to ones of the first image detecting component 232a, and a detailed description is omitted herein for simplicity. The first image detecting component 232a includes a light receiving unit 240, which includes a plurality of pixels 235, for receiving an optical signal from the object. The first image detecting component 232a further includes a digital signal processing unit 242 electrically connected to the light receiving unit 240. The digital signal processing unit 242 processes the optical signal detected by the pixels 235, and transmits the optical signal to a central processing unit 244. The central processing unit 244 is electrically connected to the digital signal processing unit 242 for calculating a position of the object over the sensory area 241. In this embodiment of the present invention, the optical signal detected by the pixels 235 of the light receiving unit 240 represents the imaging position of the darkness point formed by the object.

A locating method preferably applied to the above-mentioned optical touch device 200 is illustrated as following. First, the pixels 235 of the first image detecting component 232a and the second image detecting component 232b are divided. The first image detecting component 232a is an example to describe the details. The pixels 235 of the first image detecting component 232a are divided into a first group G1 and a second group G2 along a first direction D. When the first group G1 detects a the darkness point formed by the object inside the sensory area 214, a first algorithm is utilized to calculate a position of the darkness point; when the second group G2 detects the darkness point formed by the object inside the sensory area 214, a second algorithm is utilized to calculate the position of the darkness point.

Because the pixels 235 of the first image detecting component 232a are divided into the first group G1 and the second group G2, the third sidewall 203 is divided into a first section 2031 connected to the second sidewall 202 and a second section 2032 connected to the fourth sidewall 204 accordingly. The darkness point imaged on the first section 2031 of the third sidewall 203 can be detected by the first group G1, and the first algorithm is utilized to calculate the position of this darkness point, thereby the position of the object can be determined. The darkness point imaged on the fourth sidewall 204 and the second section 2032 of the third sidewall 203 can be detected by the second group G2, and the second algorithm is utilized to calculate the position of this darkness point, thereby the position of the object can be determined. The connecting portion of the fourth sidewall 204 and the second section 2032 of the third sidewall 203 is a corner of the sensory area 214, and the corner is opposite to the first image detecting component 232a. It is to say, the field of view of the second group G2 of the first image detecting component 232a covers the corner of the sensory area 214 opposite to the first image detecting component 232a. In this embodiment, the first algorithm can be a gravity center calculating method, and the second algorithm can be a medium center calculating method. Selection of the first algorithm and the second algorithm are not limited to the above-mentioned methods, and depend on design demand.

For the first image detecting component 232a, the darkness point imaged on the first section 2031 of the third sidewall 203 is generally formed by the object located inside a region 214a (such as the conventional insensitive area) of the sensory area 214. Because the position of the darkness point formed by the object inside the region 214a is calculated by the gravity center calculating method rather than the medium center calculating method, an accuracy of determining the position of the object can be improved. In addition, for the first image detecting component 232a, the darkness point imaged on the connecting portion of fourth sidewall 204 and the third sidewall 203 is located at the fourth sidewall 204 and the second section 2032 of the third sidewall 203. In the embodiment, when the darkness point is imaged on the fourth sidewall 204 and the second section 2032 of the third sidewall 203, the position of the darkness point is calculated by the medium center calculating method rather than the gravity center calculating method, and the accuracy of determining the position of the object can be effectively improved.

The dividing method of the pixels 235 of the second image detecting component 232b is similar to the dividing method of the pixels 235 of the first image detecting component 232a as mentioned above, and the detailed description is omitted herein for simplicity. Accordingly, the first sidewall 201 includes a third section (not labeled in figures) connected to the second sidewall 202 and a fourth section (not labeled in figures) connected to the fourth sidewall 204. The first group G1 of the second image detecting component 232b detects the third section, and the second group G2 of the second image detecting component 232b detects the fourth sidewall 204 and the fourth section of the first sidewall 201. The calculating method of the darkness point detected by the first group G1 and the second group G2 of the second image detecting component 232b is similar to ones of the first image detecting component 232a as mentioned above, and the detailed description is omitted herein for simplicity.

As aforesaid description, the locating method of the optical touch device 200 in this embodiment can divide the pixels 235 of the first image detecting component 232a and the second image detecting component 232b into a number of groups. When the pixels 235 of different groups detect the darkness point formed by the object inside the sensory area 214, a suitable algorithm is determined to calculate the position of the darkness point. Thus, the locating method of the optical touch device 200 of the present invention can accurately confirm the position of the darkness point formed by the object, so as to improve the locating accuracy of the object.

Figure 6:
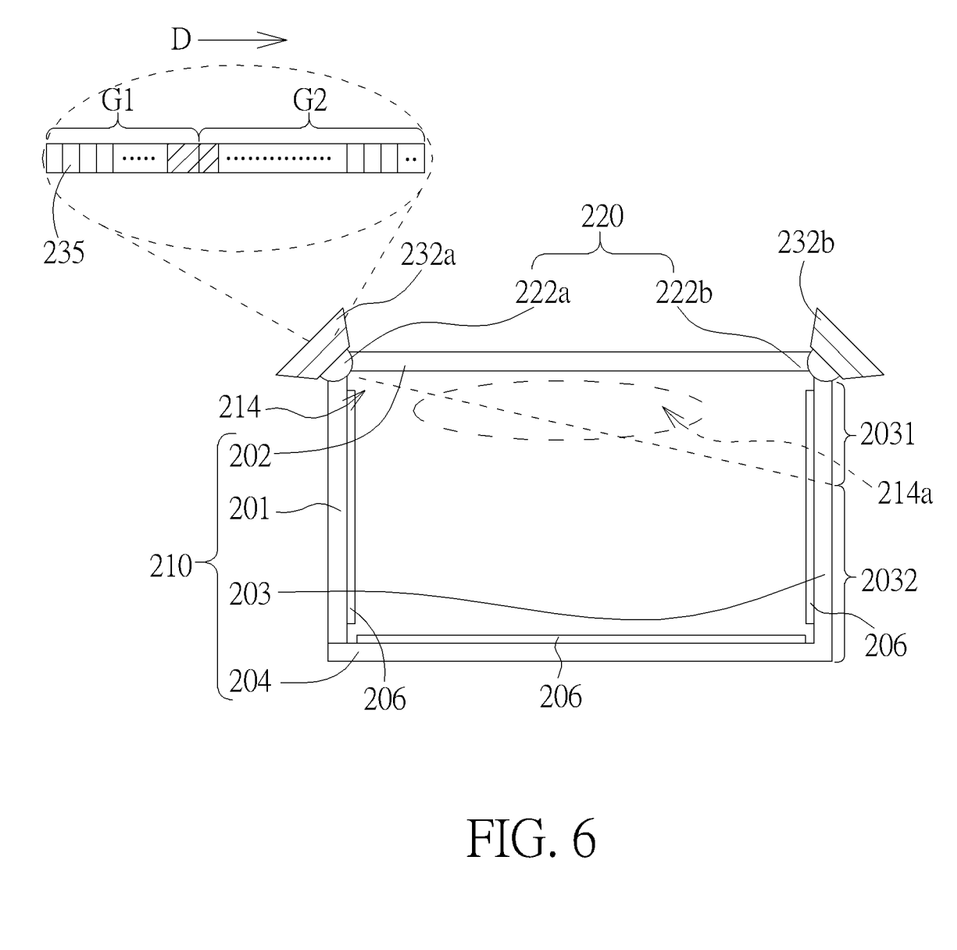
FIG. 6 is a diagram of the optical touch device according to the embodiment of the present invention.

It should be mentioned that the present invention further provides a locating method of calculating the darkness point which is imaged on a boundary between the first section 2031 and the second section 2032 of the third sidewall 203 for the preferred locating accuracy. Please refer to FIG. 6. FIG. 6 is a diagram of the optical touch device 200 according to the embodiment of the present invention. When the darkness point formed by the object is located between the first section 2031 and the second section 2032, the first group G1 and the second group G2 can simultaneously detect the darkness point (such as the oblique area), the central processing unit 244 of the first image detecting component 232a can compare the dimension ratio of the darkness point relative to the pixels 235 of the first group G1 with the dimension ratio of the darkness point relative to the pixels 235 of the second group G2, determine whether the darkness point is located at the first group G1 or the second group G2 according to the maximal dimension ratio, and utilize the corresponding algorithm to calculate the imaging position of the darkness point.

For example, as the dimension ratios of the darkness point imaged on the first section 2031 and the second section 2032 respectively are 70% and 30%, the central processing unit 244 can recognize the dimension ratio of the darkness point relative to the first group G1 is greater than the dimension ratio of the darkness point relative to the second group G2, and the gravity center calculating method, which corresponds to the first group G1, is utilized to calculate the imaging position of the darkness point inside the first image detecting component 232a. As the dimension of the darkness point imaged on the second section 2032 is greater than the dimension of the darkness point imaged on the first section 2031, the central processing unit 244 can utilize the medium center calculating method, which corresponds to the second group G2, to calculate the imaging position of the darkness point inside the first image detecting component 232a.

When the dimension ratio of the darkness point imaged on the first section 2031 is substantially equal to the dimension ratio of the darkness point imaged on the second section 2032, the central processing unit 244 can directly set the darkness point on the second group G2, and the medium center calculating method is utilized to calculate the imaging position of the darkness point inside the first image detecting component 232a. Further, the central processing unit 244 can set the darkness point on the first group G1 or the second group G2 according to an imaging position of a former darkness point detected by the first image detecting component 232a when the dimension ratio of the darkness point imaged on the first section 2031 is substantially equal to the dimension ratio of the darkness point imaged on the second section 2032. For example, as the former darkness point is detected by the first group G1 or set on the first group G1, the latter darkness point located average between the first group G1 and the second group G2 is determined to locate on the first group G1; as the former darkness point is detected by the second group G2, the latter darkness point located average between the first group G1 and the second group G2 is determined to locate on the second group G2. The first image detecting component 232*a* can preferably recognize a continued moving track of the object when the object moves inside the sensory area 214.

The first image detecting component 232*a* further can set the dimension ratios of the darkness point relative to the first group G1 and the second group respectively as weight indices, to accurately calculate the imaging position of the darkness point inside the first image detecting component 232*a*. For example, as the dimension ratios of the darkness point imaged on the first section 2031 and the second section 2032 respectively are 70% and 30%, the central processing unit 244 utilizes the gravity center calculating method to calculate a first subgroup imaging position (value of the gravity center) of a part of the darkness point (seventy percent of a total area) on the first group G1, and further utilizes the medium center calculating method to calculate a second subgroup imaging position (value of the medium center) of the other part of the darkness point (thirty percent of the total area) on the second group G2. The first subgroup imaging position (the value of the gravity center) and the second subgroup imaging position (the value of the medium center) are respectively multiplied by 70% and 30% to acquire two multiplication results, and the multiplication results are added up to obtain the final imaging position of the darkness point inside the first image detecting component 232*a*.

Besides, the other calculating method utilizes different algorithms to respectively calculate temporary imaging positions of the fully darkness point inside the first image detecting component 232*a*, and then calculates the final imaging position of the darkness point according to the above-mentioned weight indices. For example, as the dimension ratios of the darkness point imaged on the first section 2031 and the second section 2032 respectively are 70% and 30%, the central processing unit 244 utilizes the gravity center calculating method to calculate a first temporary imaging position of the fully darkness point inside the first image detecting component 232*a*, and further utilizes the medium center calculating method to calculate a second temporary imaging position of the fully darkness point inside the first image detecting component 232*a*. The first temporary imaging position and the second temporary imaging position are respectively multiplied by the corresponding weight indices (such as 70% and 30%) to acquire two multiplication results, and the multiplication results are added up to obtain the final imaging position of the darkness point inside the first image detecting component 232*a*. Calculation of the imaging position according to the partial darkness point or the fully darkness point is executed according to actual demand, and the suitable calculation mode can be selected by parameter adjustment of the optical touch device 200.

Figure 7:
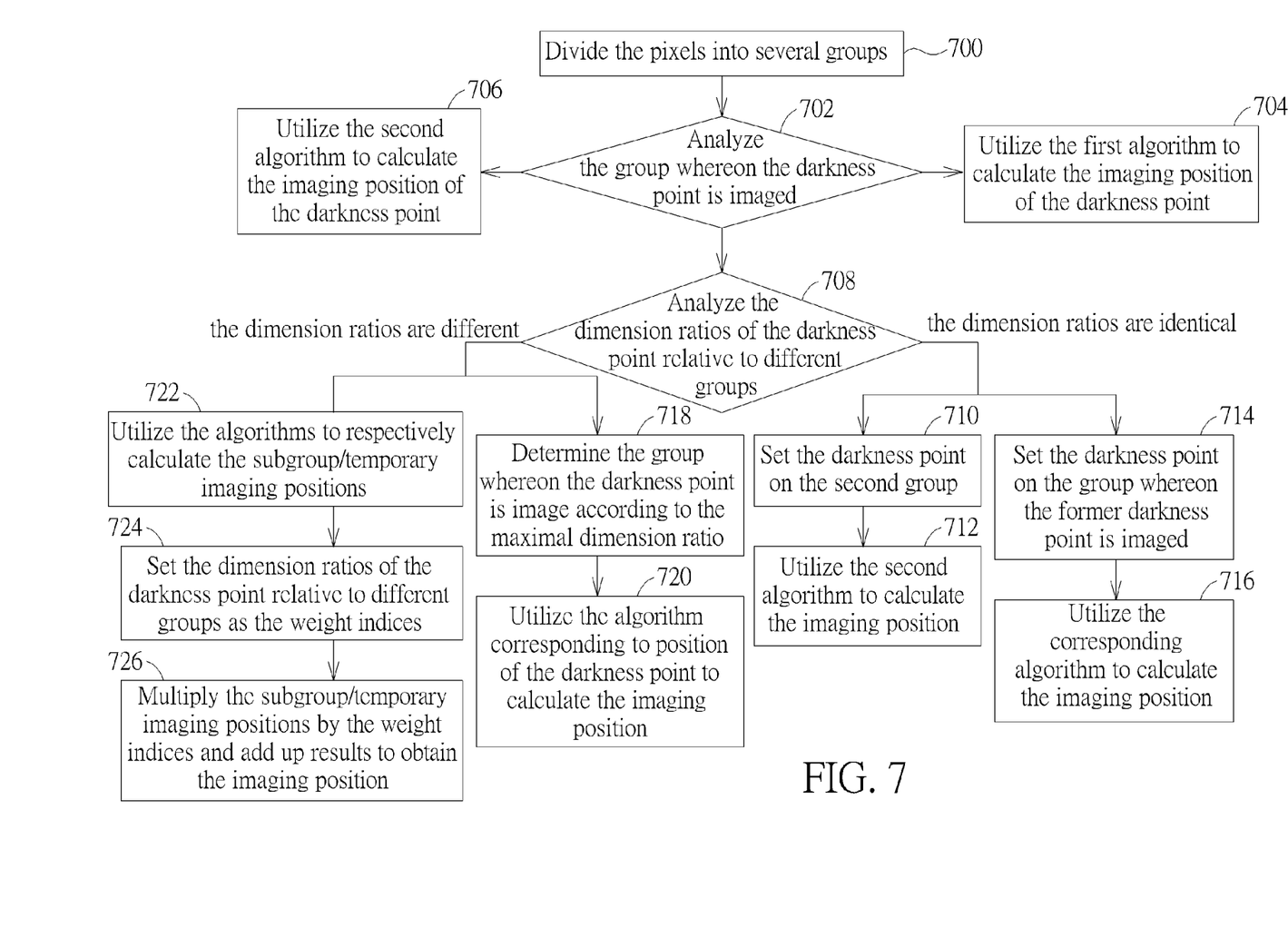
FIG. 7 is a flow chart of the locating method according to the embodiment of the present invention.

Please refer to FIG. 7. FIG. 7 is a flow chart of the locating method according to the embodiment of the present invention. The locating method illustrated in FIG. 7 is suitable for the image detecting component and the optical touch device shown in FIG. 4 to FIG. 6. The locating method applied to the optical touch device 200 is introduced as following.

First, step 700 is executed that the plurality of pixels 235 can be divided into the first group G1 and the second group G2 by the digital signal processing unit 242. Then, step 702 is executed so the central processing unit 244 analyzes the group of the pixels 235 whereon the darkness point formed by the object is imaged. As the first group G1 detects the darkness point, step 704 is executed and the central processing unit 244 utilizes the first algorithm (the gravity center calculating method) to calculate the imaging position of the darkness point on the light receiving unit 240. As the second group G2 detects the darkness point, step 706 is executed and the central processing unit 244 utilizes the second algorithm (the medium center calculating method) to calculate the imaging position of the darkness point on the light receiving unit 240.

As the first group G1 and the second group G2 simultaneously detect the darkness point, step 708 is executed and the central processing unit 244 analyzes the dimension ratios of the darkness point respectively relative to the first group G1 and the second group G2. When the dimension ratio of the darkness point relative to the first group G1 is identical with the dimension ratio of the darkness point relative to the second group G2, step 710 is selectively executed to set the darkness point on the second group G2, and then step 712 is executed to utilize the second algorithm (the medium center calculating method) to calculate the imaging position of the darkness point on the light receiving unit 240 by the central processing unit 244. Alternatively, step 714 is executed when the dimension ratios of the darkness point relative to the first group G1 and the second group G2 are the same. The darkness point is set on the first group G1 or the second group G2 of the pixels 235 to the same as the imaging position of the former darkness point; and then step 716 is executed, the central processing unit 244 utilizes the corresponding algorithm to calculate the imaging position of the darkness point on the light receiving unit 240 according to the group whereon the darkness point is imaged.

When the dimension ratio of the darkness point relative to the first group G1 is different from the dimension ratio of the darkness point relative to the second group G2, step 718 is executed selectively to determine whether the darkness point is imaged on the first group G1 or the second group G2 according to the group of the pixels 235 whereto the maximal dimension ratio conforms. Step 720 is executed to utilize the suitable algorithm to calculate the final imaging position according to the determined group, which corresponds to the maximal dimension ratio of the darkness point. Alternatively, step 722 is executed when the dimension ratios of the darkness point relative to the first group G1 and the second group G2 are different. The central processing unit 244 utilizes the first algorithm and the second algorithm to respectively calculate the subgroup imaging positions or the temporary imaging positions of the darkness point. Step 724 is executed that the central processing unit 244 sets the dimension ratio of the darkness pint relative to the first group G1 as the weight index w, and sets the dimension ratio of the darkness pint relative to the second group G2 as the weight index (1-w). Later, step 726 is executed that the central processing unit 244 multiplies the first subgroup imaging position or the first temporary imaging position by the weight index w to acquire one multiplication result, and multiplies the second subgroup imaging position or the second temporary imaging position by the weight index (1-w) to acquire the other multiplication result. The two multiplication results are added up, so as to obtain the final imaging position of the darkness point inside the image detecting component.

Step 722 can selectively calculate the first subgroup imaging position (the value of the gravity center) and the second subgroup imaging position (the value of the medium center) of different parts of the darkness point relative to the first group G1 and the second group G2, or calculate the first temporary imaging position and the second temporary imaging position of the fully darkness point inside the image detecting component by different algorithms. Step 726 can calculate the final imaging position of the darkness point according to the subgroup imaging positions or the temporary imaging positions. Method of applying the subgroup imaging position calculates the values of the gravity center and the medium center according to different parts of the darkness point relative to different groups, to prevent the values of the gravity center or the medium center from shift due to the executed algorithm unmatched with the group whereon the darkness point is imaged. Method of applying the temporary position calculates the values of the gravity center and the medium center of the fully darkness point inside the image detecting component without classification, and adjusts the shift error by the weight indices to obtain the correct imaging position.

Figure 8:
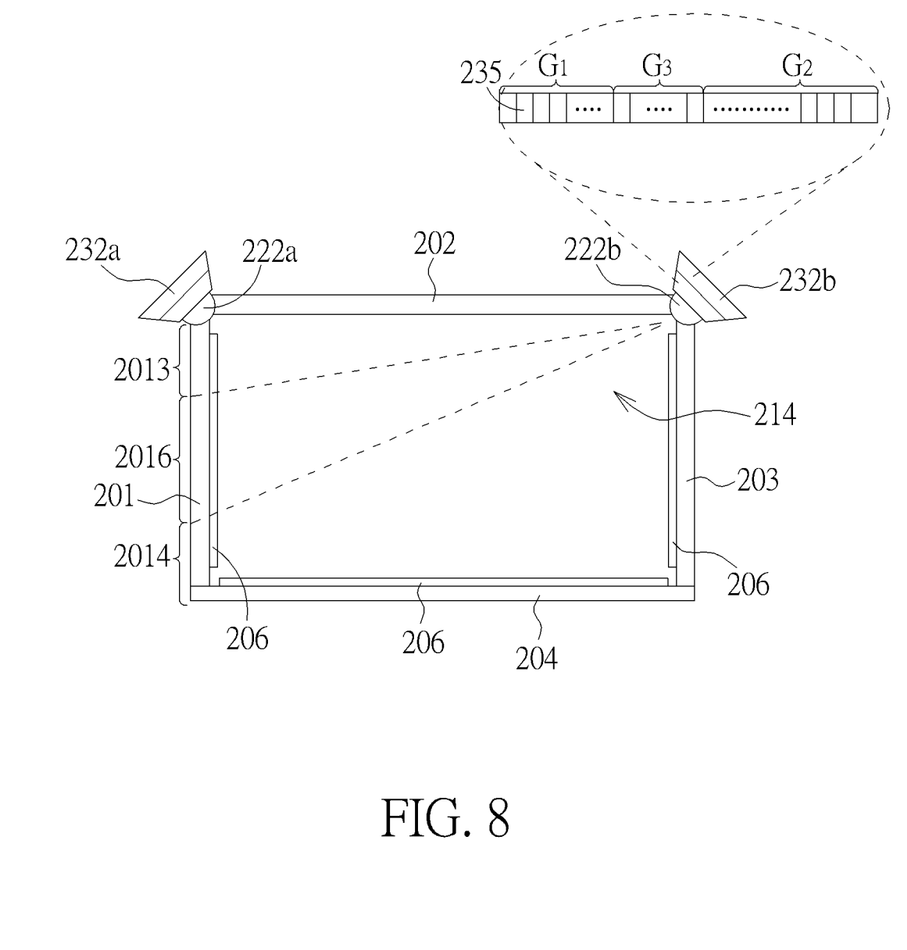
FIG. 8 is a diagram of the optical touch device according to the other embodiment of the present invention.

Please refer to FIG. 8. FIG. 8 is a diagram of the optical touch device according to the other embodiment of the present invention. In this embodiment, elements having the same numerals as ones of the above-mentioned embodiment have the same structures and function, and a detailed description is omitted herein for simplicity. Difference between the two embodiments is that the pixels 235 of the first image detecting component 232a and the second image detecting component 232b are divided into three groups. The second image detecting component 232b is an example here to describe the details. The pixels 235 of the second image detecting component 232b are divided into the first group G1, the second group G2 and a third group G3. The third group G3 is located between the first group G1 and the second group G2.

Because the pixels 235 of the second image detecting component 232b are divided into the first group G1, the second group G2 and the third group G3, the first sidewall 201 is divided into a third section 2013 connected to the second sidewall 202, a fourth section 2014 connected to the fourth sidewall 204, and a sixth section 2016 connected between the third section 2013 and the fourth section 2014 accordingly. The darkness point formed on the third section 2013 of the first sidewall 201 can be detected by the first group G1. The darkness point formed on the fourth sidewall 204 and the fourth section 2014 of the first sidewall 201 can be detected by the second group G2. The darkness point formed on the sixth section 2016 of the first sidewall 201 can be detected by the third group G3. The connecting portion of the fourth sidewall 204 and the fourth section 2014 of the first sidewall 201 is a corner of the sensory area 214. The corner is opposite to (faces toward) the second image detecting component 232b. The field of view of the second group G2 of the second image detecting component 232b covers the corner of the sensory area 214 opposite to the second image detecting component 232b.

Similar to the above-mentioned embodiment, when the first group G1 detects the darkness point formed by the object inside the sensory area 214, the position of the darkness point is calculated by the first algorithm to determine the position of the object. When the second group G2 detects the darkness point formed by the object inside the sensory area 214, the position of the darkness point is calculated by the second algorithm to determine the position of the object. In addition, when the third group G3 detects the darkness point formed by the object inside the sensory area 214, the position of the darkness point is calculated by a third algorithm to determine the position of the object. In the present invention, the first algorithm is preferably the gravity center calculating method, the second algorithm is preferably the medium center calculating method, and the third algorithm is a combination of the first algorithm and the second algorithm. Calculating method of each algorithm is not limited to the above-mentioned embodiment, and depends on design demand. The detailed description of the third algorithm is introduced as following.

First, the position of the darkness point formed by the object is respectively calculated by the first algorithm and the second algorithm to obtain a first value and a second value. For example, when the third group G3 of the second image detecting component 232b detects the darkness point formed by the object, the first temporary imaging position and the second temporary imaging portion of the darkness point are respectively calculated by the first algorithm (the gravity center calculating method) and the second algorithm (the medium center calculating method), so as to obtain the first value $C_i$ and the second value $C_m$. The first value $C_i$ represents a calculated result by the first algorithm, and the second value $C_m$ represents a calculated result by the second algorithm. The temporary imaging position may have the slight shift error relative to the actual imaging position, and the weight adjustment is utilized to amend the shift error due to the executed algorithm unmatched with the group whereon the darkness point is imaged.

Next, the first value $C_i$ is multiplied by a first weight $\alpha$ ($0<\alpha<1$) to obtain a third value $C_i'$, and the second value $C_m$ is multiplied by a second weight $(1-\alpha)$ to obtain a fourth value $C_m'$. The first weight $\alpha$ is greater than or equal to 0, and is further smaller than or equal to 1, which means the said method can utilize the first algorithm or the second algorithm alternatively to calculate the position (coordinates) of the darkness point according to system's demand, the imaging position and features of the darkness point, and so on. The first weight $\alpha$ can be a constant value, therefore, the first weight $\alpha$ is invariable when any pixel 235 of the third group G3 detects the darkness point. In the other embodiment, the first weight $\alpha$ can be a variable value. That first weight $\alpha$ is variable when different pixels 235 of the third group G3 detect the darkness point. For example, the first weight $\alpha$ becomes lager and the second weight $(1-\alpha)$ becomes smaller when the pixels 235 detecting the darkness point is more close to the first group G1. Then, the third value $C_i'$ and the fourth value $C_m'$ are added up to obtain the imaging position of the darkness point for determining the position of the object.

In this embodiment, the dividing method of the pixels 235 of the first image detecting component 232a is similar to the dividing method of the pixels 235 of the second image detecting component 232b as mentioned above, and the detailed description is omitted herein for simplicity. Accordingly, the third sidewall 203 includes a first section (not labeled in figures) connected to the second sidewall 202, a second section (not labeled in figures) connected to the fourth sidewall 204, and a fifth section (not labeled in figures) connected between the first section and the second section. The first group G1 of the first image detecting component 232a detects the first section of the third sidewall 203, the second group G2 of the first image detecting component 232a detects the fourth sidewall 204 and the second section of the third sidewall 203, and the third group G3 of the first image detecting component 232a detects the fifth section of the third sidewall 203. The calculating method applied when the darkness point is detected by the first group G1, the second group G2 and the third group G3 of the first image detecting component 232a is similar to the calculating method of the second image detecting component 232b as mentioned above, and the detailed description is omitted herein for simplicity.

Figure 9:
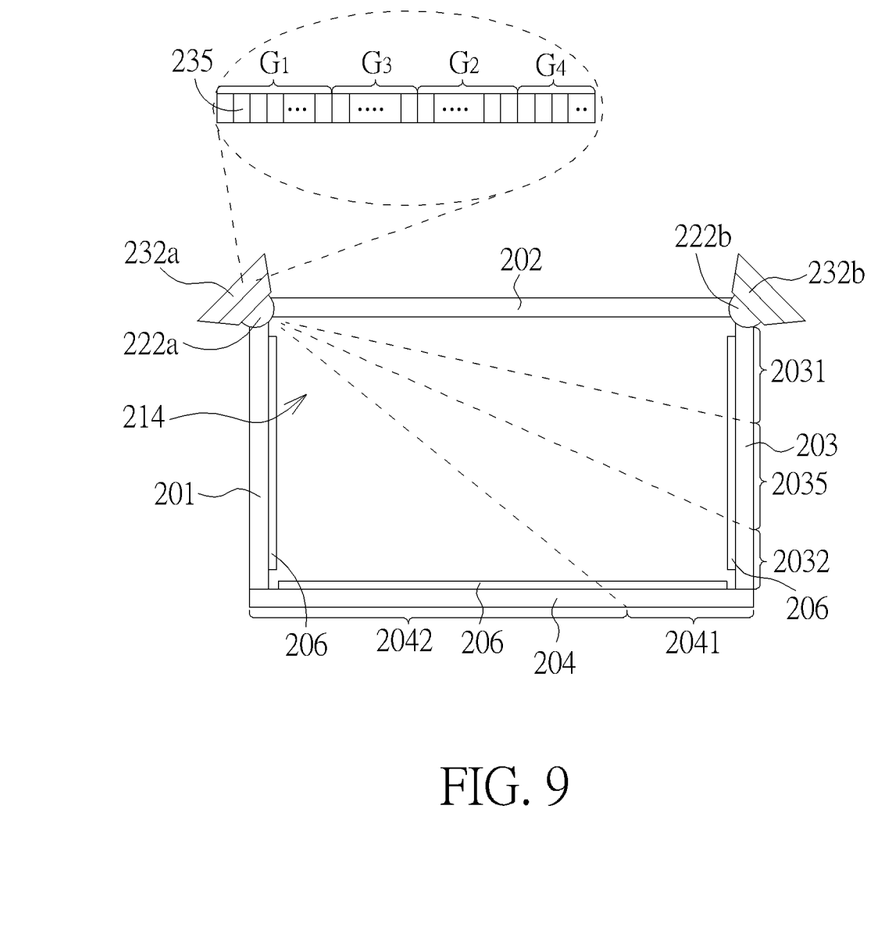
FIG. 9 is a diagram of the optical touch device according to the other embodiment of the present invention.

Please refer to FIG. 9. FIG. 9 is a diagram of the optical touch device according to the other embodiment of the present invention. In this embodiment, elements having the same numerals as ones of the above-mentioned embodiment have the same structures and function, and the detailed description is omitted herein for simplicity. Difference between the two embodiments is that the pixels 235 of the first image detecting component 232a and the second image detecting component 232b are divided into four groups. The first image detecting component 232a is an example here to describe the details. The pixels 235 of the first image detecting component 232a are divided into the first group G1, the second group G2, the third group G3 and a fourth group G4. The third group G3 is located between the first group G1 and the second group G2, and the second group G2 is located between the third group G3 and the fourth group G4.

Because the pixels 235 of the first image detecting component 232a are divided into the first group G1, the second group G2, the third group G3 and the fourth group G4, the third sidewall 203 is divided into a first section 2031 connected to the second sidewall 202, a second section 2032 connected to the fourth sidewall 204, and a fifth section 2035 connected between the first section 2031 and the second section 2032 accordingly. The fourth sidewall 204 is divided into a section 2041 adjacent to the third sidewall 203 and a section 2042 adjacent to the first sidewall 201 accordingly. The darkness point formed on the first section 2031 of the third sidewall 203 can be detected by the first group G1. The darkness point formed on the second section 2032 of the third sidewall 203 and the section 2041 of the fourth sidewall 204 adjacent to the third sidewall 203 can be detected by the second group G2. The darkness point formed on the fifth section 2035 of the third sidewall 203 can be detected by the third group G3. The darkness point formed on the section 2042 of the fourth sidewall 204 adjacent to the first sidewall 201 can be detected by the second group G4. The connecting portion of the section 2041 of the fourth sidewall 204 adjacent to the third sidewall 203 and the second section 2032 of the third sidewall 203 is a corner of the sensory area 214. The corner is opposite to (faces toward) the first image detecting component 232a. Thus, the field of view of the second group G2 of the first image detecting component 232a covers the corner of the sensory area 214 opposite to the first image detecting component 232a.

Similar to the above-mentioned embodiment, when the first group G1 detects the darkness point formed by the object inside the sensory area 214, the position of the darkness point is calculated by the first algorithm to determine the position of the object. When the second group G2 detects the darkness point formed by the object inside the sensory area 214, the position of the darkness point is calculated by the second algorithm to determine the position of the object. When the third group G3 detects the darkness point formed by the object inside the sensory area 214, the position of the darkness point is calculated by the third algorithm to determine the position of the object. In addition, when the fourth group G4 detects the darkness point formed by the object inside the sensory area 214, the position of the darkness point is calculated by either the first algorithm or the third algorithm to determine the position of the object.

In this embodiment, the first algorithm, the second algorithm and the third algorithm are similar to those algorithms described in the above-mentioned embodiments. The dividing method of the pixels 235 of the second image detecting component 232b is similar to the dividing method of the pixels 235 of the first image detecting component 232a as mentioned above, and the detailed description is omitted herein for simplicity. Accordingly, the first sidewall 201 includes a third section (not labeled in figures) connected to the second sidewall 202, a fourth section (not labeled in figures) connected to the fourth sidewall 204, and a sixth section (not labeled in figures) connected between the third section and the fourth section. The first group G1 of the second image detecting component 232b detects the third section. The second group G2 of the second image detecting component 232b detects the fourth section of the first sidewall 201 and a section of the fourth sidewall 204 adjacent to the first sidewall 201. The third group G3 of the second image detecting component 232b detects the sixth section. The fourth group G4 of the second image detecting component 232b detects a section of the fourth sidewall 204 adjacent to the third sidewall 203. The calculating method applied when the darkness point detected by the first group G1, the second group G2, the third group G3 and the fourth group G4 of the second image detecting component 232b is similar to the calculating method of the first image detecting component 232a as mentioned above, and the detailed description is omitted herein for simplicity.

In conclusion, the optical touch device and the related locating method of the present invention divides the pixels of the image detecting components into a number of groups. When the pixels of different groups detect the darkness point formed by the object, a suitable algorithm is utilized to calculate the imaging position of the darkness point inside the image detecting component for improvement of the positioning accuracy of the object. For example, the present invention utilizes the gravity center calculating method to calculate the imaging position of the darkness point formed by the object inside the insensitive area (which is illustrated in the prior art), and further utilizes the medium center calculating method to calculate the imaging position of the darkness point located at the connecting portion of two neighboring light guiding components (which are disposed on the adjacent sidewalls). When the pixels of different groups (the adjacent groups) simultaneously detect the darkness point of the object, the imaging position of the darkness point inside the image detecting component can be calculated according to the dimension ratios of the darkness point relative to the adjacent groups by the dimension comparing method or the dimension weighting method, so as to determine the adjusted touch position of the object. Comparing to the prior art, the optical touch device, the related image detecting component and the related locating method of the present invention can accurately calculate the imaging position of the darkness point inside the sensory area, to increase the touch positioning accuracy of the object.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A locating method applied to an optical touch device, the optical touch device comprising at least one image detecting component for detecting an imaging position of an object and generating a touch position of the object on a plane according to the imaging position, the at least one image detecting component comprising a plurality of pixels, the locating method comprising:

dividing the plurality of pixels into a first group and a second group along a first direction;

analyzing dimension ratios of a darkness point respectively relative to the first group and the second group when the darkness point formed by the object is simultaneously detected by the first group and the second group, wherein a first algorithm is utilized to calculate the imaging position of the darkness point inside the image detecting component when the darkness point formed by the object is detected by the first group, and a second algorithm is utilized to calculate the imaging position of the darkness point inside the image detecting component when the darkness point formed by the object is detected by the second group;

utilizing the first algorithm and the second algorithm to respectively calculate a first subgroup imaging position of the darkness point on the first group and a second subgroup imaging position of the darkness point on the second group;

setting the dimension ratio of the darkness point relative to the first group and the dimension ratio of the darkness point relative to the second group as weight indices; and multiplying the first subgroup imaging position and the second subgroup imaging position respectively by the corresponding weight indices and adding up two multiplication results, so as to obtain the imaging position of the darkness point.

2. The locating method of claim 1, wherein the first algorithm is a gravity center calculating method, and the second algorithm is a medium center calculating method.

3. The locating method of claim 1, wherein the optical touch device comprises a sensory area, a field of view of the second group of each image detecting component covers a corner of the sensory area opposite to the image detecting component.

4. The locating method of claim 1, wherein calculating the imaging position of the darkness point inside the image detecting component according to the dimension ratios comprises:

comparing the dimension ratio of the darkness point relative to the first group with the dimension ratio of the darkness point relative to the second group;

determining whether the darkness point is located at the first group or the second group according to the maximal dimension ratio; and utilizing the corresponding algorithm to calculate the imaging position of the darkness point.

5. The locating method of claim 1, wherein the darkness point is set on the second group when the dimension ratio of the darkness point relative to the first group is equal to the dimension ratios of the darkness point relative to the second group, or the darkness point is set on the first group or the second group according to an imaging position of a former darkness point detected by the image detecting component.

6. An optical touch device comprising:

a frame comprising a first sidewall, a second sidewall, a third sidewall and a fourth sidewall, the first sidewall being opposite to the third sidewall, the second sidewall being opposite to the fourth sidewall, and a sensory area being formed inside the frame;

a light source module for providing light to the sensory area;

a first image detecting component disposed between two adjacent ends of the first sidewall and the second sidewall, a field of view of the first image detecting component covering the third sidewall and the fourth sidewall; and a second image detecting component disposed between two adjacent ends of the second sidewall and the third sidewall, a field of view of the second image detecting component covering the first sidewall and the fourth sidewall;

wherein the first image detecting component and the second image detecting component respectively comprise a plurality of pixels, the plurality of pixels is at least divided into a first group and a second group along a first direction, dimension ratios of a darkness point relative to the first group and the second group are respectively analyzed when the darkness point formed by an object is simultaneously detected by the first group and the second group, so as to calculate an imaging position of the darkness point according to the dimension ratios, and to generate a touch position of the object on a plane according to the imaging position, a first algorithm is utilized to calculate the imaging position of the darkness point inside the first image detecting component when the darkness point formed by the object is detected by the first group of the first image detecting component, and a second algorithm is utilized to calculate the imaging position of the darkness point inside the first image detecting component when the darkness point formed by the object is detected by the second group of the first image detecting component, the first image detecting component utilizes the first algorithm and the second algorithm to respectively calculate temporary imaging positions or subgroup imaging positions of the darkness point, sets the dimension ratios of the darkness point relative to the first group and the second group respectively as weight indices, multiplies the temporary imaging positions or the subgroup imaging positions of the darkness point by the corresponding weight indices and adds up two multiplication results, so as to obtain the imaging position of the darkness point.

7. The optical touch device of claim 6, wherein the first algorithm is a gravity center calculating method, and the second algorithm is a medium center calculating method.

8. The optical touch device of claim 6, wherein the first image detecting component compares the dimension ratio of the darkness point relative to the first group with the dimension ratio of the darkness point relative to the second group, and determines whether the darkness point is located at the first group or the second group according to the maximal dimension ratio, so as to utilize the corresponding algorithm to calculate the imaging position of the darkness point.

9. The optical touch device of claim 6, wherein the first image detecting component sets the darkness point on the second group when the dimension ratio of the darkness point relative to the first group is equal to the dimension ratio of the darkness point relative to the second group, or the first image detecting component sets the darkness point on the first group or the second group according to an imaging position of a former darkness point detected by the first image detecting component.

10. The optical touch device of claim 6, wherein the plurality of pixels of the first image detecting component further comprises a third group along the first direction, the third group is located between the first group and the second group, a third algorithm is utilized to calculate the imaging position of the darkness point inside the first image detecting component when the darkness point formed by the object is detected by the third group.

11. The optical touch device of claim 10, wherein the plurality of pixels of the first image detecting component further comprises a fourth group along the first direction, the second group is located between the third group and the fourth group, the first algorithm and the third algorithm are alternatively utilized to calculate the imaging position of the darkness point inside the first image detecting component when the darkness point formed by the object is detected by the fourth group.

12. The optical touch device of claim 6, wherein the plurality of pixels of the second image detecting component further comprises a third group along the first direction, the third group is located between the first group and the second group.

13. The optical touch device of claim 12, wherein the plurality of pixels of the second image detecting component further comprises a fourth group along the first direction, the second group is located between the third group and the fourth group.

14. The optical touch device of claim 6, further comprising:
a plurality of light guiding components respectively disposed on the first sidewall, the third sidewall and the fourth sidewall.

15. An image detecting component applied to an optical touch device, the image detecting component comprising:
a light receiving unit, the light receiving unit comprising a plurality of pixels for receiving an optical signal from an object, the plurality of pixels being divided into a first group and a second group along a first direction;
a digital signal processing unit electrically connected to the light receiving unit for processing the optical signal detected by the plurality of pixels; and
a central processing unit electrically connected to the digital signal processing unit, the central processing unit analyzing dimension ratios of a darkness point respectively relative to the first group and the second group when the darkness point formed by the object is simultaneously detected by the first group and the second group, and calculating an imaging position of the darkness point according to the dimension ratios, so as to generate a touch position of the object on a plane according to the imaging position, wherein the central processing unit utilizes a first algorithm to calculate the imaging position of the darkness point on the light receiving unit when the darkness point formed by the object is detected by the first group, and further utilizes a second algorithm to calculate the imaging position of the darkness point on the light receiving unit when the darkness point formed by the object is detected by the second group, the central processing unit utilizes the first algorithm and the second algorithm to respectively calculate temporary imaging positions or subgroup imaging positions of the darkness point, sets the dimension ratios of the darkness point relative to the first group and the second group respectively as weight indices, multiplies the temporary imaging positions or the subgroup imaging positions of the darkness point by the corresponding weight indices and adds up two multiplication results, so as to obtain the imaging position of the darkness point.

16. The image detecting component of claim 15, wherein the central processing unit compares the dimension ratio of the darkness point relative to the first group with the dimension ratio of the darkness point relative to the second group, determines whether the darkness point is located at the first group or the second group according to the maximal dimension ratio, so as to utilize the corresponding algorithm to calculate the imaging position of the darkness point.

17. The image detecting component of claim 15, wherein the central processing unit sets the darkness point on the second group when the dimension ratio of the darkness point relative to the first group is equal to the dimension ratio of the darkness point relative to the second group, or the central processing unit sets the darkness point on the first group or the second group according to an imaging position of a former darkness point detected by the light receiving unit.

18. The image detecting component of claim 15, wherein the plurality of pixels further comprises a third group along the first direction, the third group is located between the first group and the second group, the central processing unit utilizes a third algorithm to calculate the imaging position of the darkness point on the light receiving unit when the darkness point formed by the object is detected by the third group.

19. The image detecting component of claim 18, wherein the plurality of pixels further comprises a fourth group along the first direction, the second group is located between the third group and the fourth group, the central processing unit utilizes the first algorithm or the third algorithm to calculate the imaging position of the darkness point on the light receiving unit when the darkness point formed by the object is detected by the fourth group.

20. A locating method applied to an optical touch device, the optical touch device comprising at least one image detecting component for detecting an imaging position of an object and generating a touch position of the object on a plane according to the imaging position, the at least one image detecting component comprising a plurality of pixels, the locating method comprising:
dividing the plurality of pixels into a first group and a second group along a first direction;
analyzing dimension ratios of a darkness point respectively relative to the first group and the second group when the darkness point formed by the object is simultaneously detected by the first group and the second group, wherein a first algorithm is utilized to calculate the imaging position of the darkness point inside the image detecting component when the darkness point formed by the object is detected by the first group, and a second algorithm is utilized to calculate the imaging position of the darkness point inside the image detecting component when the darkness point formed by the object is detected by the second group;
utilizing the first algorithm and the second algorithm to respectively calculate a first temporary imaging position and a second temporary imaging position of the darkness point inside the image detecting component;
setting the dimension ratio of the darkness point relative to the first group and the dimension ratio of the darkness point relative to the second group as weight indices; and
multiplying the first temporary imaging position and the second temporary imaging position respectively by the corresponding weight indices and adding up two multiplication results, so as to obtain the imaging position of the darkness point.

21. The locating method of claim 20, wherein the first algorithm is a gravity center calculating method, and the second algorithm is a medium center calculating method.

22. The locating method of claim 20, wherein the optical touch device comprises a sensory area, a field of view of the second group of each image detecting component covers a corner of the sensory area opposite to the image detecting component.

23. The locating method of claim 20, wherein calculating the imaging position of the darkness point inside the image detecting component according to the dimension ratios comprises:
comparing the dimension ratio of the darkness point relative to the first group with the dimension ratio of the darkness point relative to the second group;
determining whether the darkness point is located at the first group or the second group according to the maximal dimension ratio; and
utilizing the corresponding algorithm to calculate the imaging position of the darkness point.

24. The locating method of claim 20, wherein the darkness point is set on the second group when the dimension ratio of the darkness point relative to the first group is equal to the dimension ratios of the darkness point relative to the second group, or the darkness point is set on the first group or the second group according to an imaging position of a former darkness point detected by the image detecting component.

25. A locating method applied to an optical touch device, the optical touch device comprising at least one image detecting component for detecting an imaging position of an object and generating a touch position of the object on a plane according to the imaging position, the at least one image detecting component comprising a plurality of pixels, the locating method comprising:

dividing the plurality of pixels into a first group and a second group along a first direction;

analyzing dimension ratios of a darkness point respectively relative to the first group and the second group when the darkness point formed by the object is with simultaneously detected by the first group and the second group, wherein a first algorithm is utilized to calculate the imaging position of the darkness point inside the image detecting component when the darkness point formed by the object is detected by the first group, and a second algorithm is utilized to calculate the imaging position of the darkness point inside the image detecting component when the darkness point formed by the object is detected by the second group; and calculating the imaging position of the darkness point inside the image detecting component according to the dimension ratios;

wherein the plurality of pixels is divided into the first group, the second group and a third group along the first direction, the third group is located between the first group and the second group, a third algorithm is utilized to calculate the imaging position of the darkness point inside the image detecting component when the darkness point formed by the object is detected by the third group, and the third algorithm comprises:

utilizing the first algorithm and the second algorithm to respectively calculate a first temporary imaging position and a second temporary imaging position of the darkness point formed by the object to obtain a first value and a second value;

multiplying the first value by a first weight $\alpha$ to obtain a third value, and multiplying the second value by a second weight $(1-\alpha)$ to obtain a fourth value, wherein a is greater than or equal to 0 and is further smaller than or equal to 1; and adding up the third value and the fourth value to obtain the imaging position of the darkness point.

26. The locating method of claim 25, wherein the first weight $\alpha$ used by the third algorithm becomes larger when an amount of the pixels of the third group close to the first group for detecting the darkness point formed by the object becomes greater.

27. The locating method of claim 25, wherein the plurality of pixels is further divided into the first group, the second group, the third group and a fourth group along the first direction, the second group is located between the third group and the fourth group, the first algorithm and the third algorithm are alternatively utilized to calculate the imaging position of the darkness point inside the image detecting component when the darkness point formed by the object is detected by the fourth group.

* * * * *